Dec. 5, 1950  C. C. BROWN  2,532,537
PROTRACTOBOARD
Filed July 2, 1945
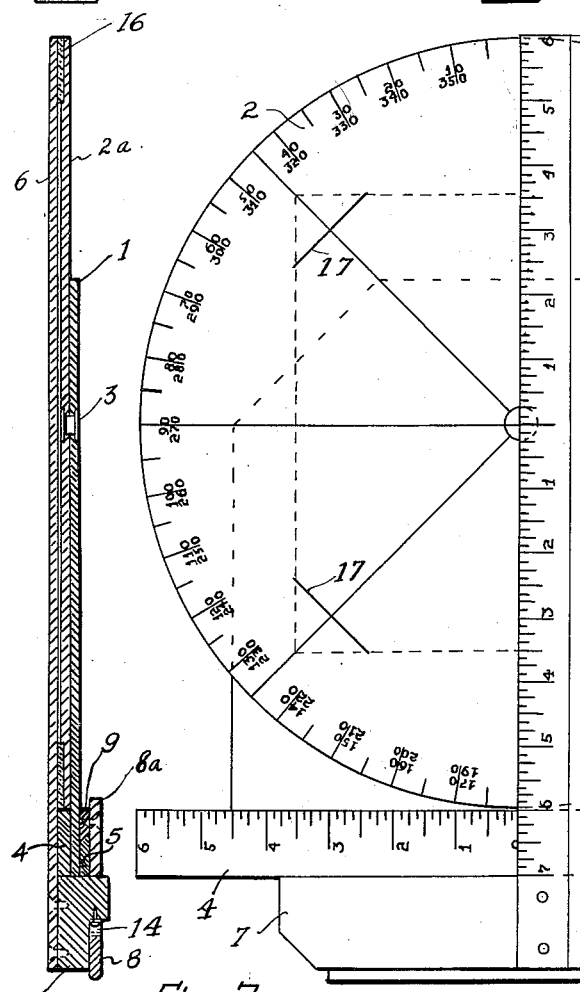
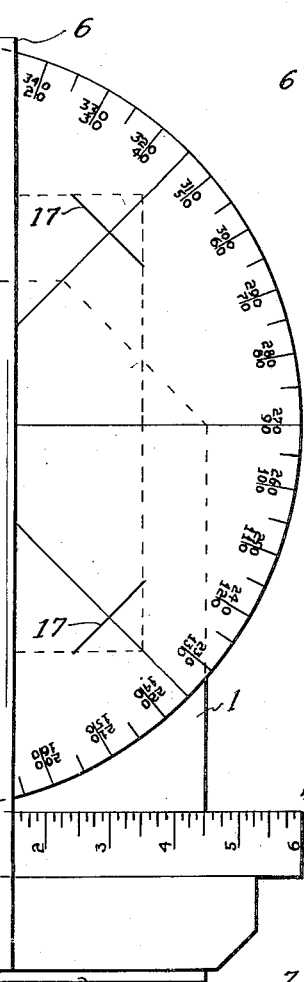
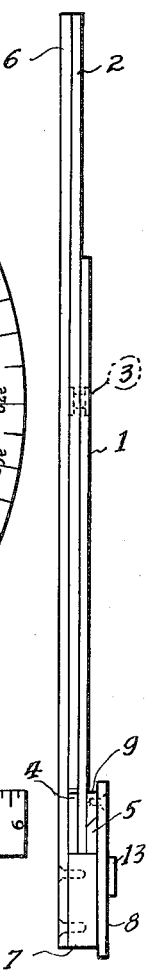
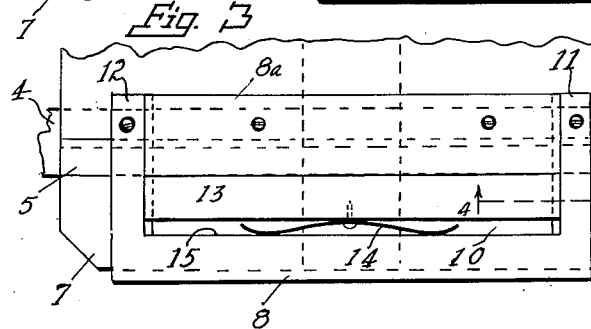
CHARLES C. BROWN
Inventor
By Herbert E. Smith
Attorney Patented Dec. 5, 1950

2,532,537

UNITED STATES PATENT OFFICE 2,532,537

PROTRACTOBOARD

Charles C. Brown, Spokane, Wash.

Application July 2, 1945, Serial No. 602,765

1 Claim. (Cl. 33—78)

The present invention relates to an improved drafting implement, instrument, or appliance as a skillful aid for use by draftsmen, engineers, architects, artisans and craftsmen, in solving various types of problems, and in executing sketches, drawings, charts, and other similar productions.

The drawing implement, which is efficient and accurate in manual operation, and compact and simple in construction, involves the combination with a base and a circular protractor dial, of an adjustable T-square unit, and means for maintaining these co-acting parts in operative arrangement in order that the implement may be utilized by those skilled in an art for accurate, precise, and quick manipulation of its parts.

The cooperating parts of the implement may be provided with a variety of scales, graduations, indices and calculations, thus adapting it for use by those skilled in different professions, and the implement may be fashioned in various sizes and shapes, and of various materials especially adapted for different purposes.

In the accompanying drawings I have illustrated one complete example of the physical embodiment of my invention involving certain novel combinations and arrangements of parts, and these parts are equipped with one set of scales; but it will be understood that changes may be made in the structures of the exemplifying drawings, and in the sets of scales disclosed herein, within the scope of my appended claim, without departing from the principles of the invention.

Figure 1 is a plan view of the drafting appliance or instrument embodying my invention.

Figure 2 is an edge view of the appliance.

Figure 3 is a detail view showing the friction retarder for the T-square unit.

Figure 4 is an enlarged detail sectional view showing the relation of the T-square unit to the base board and drawing board of the instrument.

Figure 5 is a longitudinal sectional view of the appliance taken substantially along the center line of Figure 1, but illustrating a somewhat different drawing board structure.

In physically embodying my invention I utilize a base board 1 of suitable size, shape and material that is adapted to rest without undue obstructions upon any suitable support, and the base board affords a convenient support for the operating and movable parts of the instrument.

Upon the upper face of the base board is pivotally mounted a circular disk or dial 2, and the upstanding rivet 3 of the base board forms the pivotal center of the dial, which performs the functions of a drawing board and the added functions of a circular protractor. As here shown the dial is provided with an annular edge scale or protractor index, divided to five degrees, and the face of the dial is provided with centered, and intersecting radial lines or diameters and diagonals. In addition, the dial is provided with a square having tangential corner lines that intersect alternate radial lines of the dial. By means of these graduations and marks, the dial may be employed in dividing circles, transferring angles, drawing oblique lines at right angles to each other, or laying off given angles each side of a vertical or horizontal center line.

At one side of and closely adjoining the periphery of the dial a side bar 4 is fixed to the base board tangent to the dial with its adjoining edge parallel with a center line of the dial, and, as indicated, the face of this fixed bar is provided with an edge scale divided into fractions of inches. Preferably the side bar 4 has the graduations extending toward both ends from a zero point where a line perpendicular to the bar 4 through the axis of the dial 2 meets the bar.

On the under side of the base board 1, and parallel with the side bar 4 on the upper face of the board, a bead 5 is firmly fixed and provided with a bevel edge, and this bead forms a guide for the T-square that is mounted with its blade extending across the side bar 4 and the dial 2.

The T-square includes the usual blade or straight edge 6, that is provided with an inch scale reading up and down from the horizontal center line of the dial 2, and the blade is firmly fixed to its slide head or handle portion 7, parallel with and in sliding contact with the side bar.

In order to guide and retain the T-square in position a back plate 8 is provided. The plate 8 has a bevelled bead or strip 9 thereon to engage the bead 5 of the base board and co-act therewith in keeping the plate in alignment with the bead 5. The T-square head 7 is shown as connected to the plate in such fashion as to be yieldingly, and releasably, pressed into contact with the side bar 4. The plate 8 is cut out as indicated at 10 to provide two side rails 11 and 12. These side rails are bevelled to fit correspondingly bevelled surfaces that are formed on a depending portion 13 of the head 7. One or more flat bow shaped springs 14 are inserted between the back edge of the depending part 13 and the opposing face 13 of the plate 8. The springs 14 will urge the head 7 into clamping engagement with the side bar 4 with enough force to allow the draftsman to use the square without displacement. When it is necessary to shift the square, the draftsman can press the head back against the force of the springs 14 so that the head will slide easily.

In Figure 5 I have shown the drawing board 2a with a raised rim 16 of transparent material such as glass, or one of the transparent resin products. Lucite is the trade name of a suitable material for the rim 16. The indicia around the periphery of the board may well be covered by the transparent material for protection. The rim serves to hold the portion 6 of the T-square spaced from a drawing sheet on the board when the square or the board is moved to prevent smearing of the drawing. The drawing board 2 may be of any suitable material, such as a light metal or alloy, wood, fiber board, a plastic composition, or a metal stamping. The entire top of the board preferably is covered with a transparent coating of such nature as to prevent wear on the graduations and other matter printed, etched, stamped, or otherwise formed on the surface of the board. The small slots 17 shown in Figure 1 are for the purpose of receiving the corners of a sheet on which the drawing is to be made. Sheets may also be secured by scotch tape or other means.

The two side rails of the plate 8 serve as the means for securing the bead 9, and the bead 9 in turn secures the back portion 8a of the plate 8. This back portion is put in place after the head 7 is inserted between the side rails.

The graduations and other markings on the dial of the drawing board, the indicia on the square and on the side bar are only representative and may be varied to fit the board to any particular use.

Having thus fully described my invention, what I claim as new and desire to secure by Letters Patent is:

In a drafting implement, a base board, a rigid side bar on the upper face of said base board at one side edge thereof, a retaining bevelled bead on the under face of said board at said side edge and parallel with the side bar, a T-square having a blade resting on the side bar and extending over said board and spaced therefrom by said bar whereby to receive a drawing board between the blade and the base board, the T-square having a slide head to which the blade is secured, said slide head having a front face extending along and guided by the outer side edge of said side bar and extending below the adjacent edges of the base board and bead, a latch plate slidably mounted for limited movement toward and away from the base board on the under face of said slide head, and having side rails extending under the base board, said slide head having a depending portion slidably engaging with said rails, a bevelled bead on the front of said plate interlocked with the bead on said board, and spring means interposed between the depending portion of said slide head and the plate edge between said rails, yieldingly holding the beads in engagement and said slide head against the base board.

CHARLES C. BROWN.

REFERENCES CITED

The following references are of record in the file of this patent:

UNITED STATES PATENTS

| Number | Name | Date |
|---|---|---|
| 527,134 | Van Horn et al. | Oct. 9, 1894 |
| 824,966 | Werner | July 3, 1906 |
| 976,019 | Wells | Nov. 15, 1910 |
| 1,020,253 | Blair | Mar. 12, 1912 |
| 1,389,904 | Rudolph | Sept. 6, 1921 |
| 1,440,993 | Hasbrouck | Jan. 2, 1923 |
| 1,906,300 | Yaxley | May 2, 1933 |

FOREIGN PATENTS

| Number | Country | Date |
|---|---|---|
| 576,708 | France | May 19, 1924 |